(12) United States Patent
Jitariouk et al.

(10) Patent No.: US 6,258,271 B1
(45) Date of Patent: Jul. 10, 2001

(54) HOLLOW MEMBRANES WITH CAPILLARY TUBES

(75) Inventors: Nikolaï Jitariouk, Paris; Alain le Moel, Chaville, both of (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/331,728
(22) PCT Filed: Oct. 28, 1998
(86) PCT No.: PCT/FR98/02310
§ 371 Date: Aug. 16, 1999
§ 102(e) Date: Aug. 16, 1999
(87) PCT Pub. No.: WO99/21643
PCT Pub. Date: May 6, 1999

(30) Foreign Application Priority Data

Oct. 29, 1997 (FR) .................................. 97 13567

(51) Int. Cl.$^7$ .................................. B01D 69/00
(52) U.S. Cl. .................. 210/500.23; 210/500.27; 210/500.28
(58) Field of Search .......... 210/321.75, 321.79, 210/321.78, 321.8, 321.84, 321.87, 321.88, 321.89, 500.23, 500.27, 500.28

(56) References Cited

U.S. PATENT DOCUMENTS

| | | |
|---|---|---|
| 3,764,018 * | 10/1973 | Shaw et al. |
| 4,177,228 | 12/1979 | Prolss |
| 4,959,152 | 9/1990 | Nichols |
| 5,096,586 * | 3/1992 | Kaner et al. |
| 5,104,535 | 4/1992 | Cote et al. |
| 5,232,593 | 8/1993 | Pederson et al. |
| 5,328,610 * | 7/1994 | Rogut |

FOREIGN PATENT DOCUMENTS

| | | |
|---|---|---|
| 0 000 687 | 2/1979 | (EP) |
| 0 562 303 | 9/1993 | (EP) |
| WO 95/00238 | 5/1995 | (WO) |

OTHER PUBLICATIONS

P. Yu Apel, V.I. Kuznetsow, N.I. Zhitariuk, & O.L. Orelovich, (1985) Nuclear ultrafilters, *Colloid Journal of the USSR*, 47, 1–5.

Flerov, G.N., "Synthese Des Elements Superlourds Et Application Des Methodes De Physiques Nucleaire Dans Les Domaines Voisins." *Vestnik de l'academie des sciences de l'URSS*, 1984, n° 4, p. 35–48 (in Russian).

W.S. Winston Ho and K.K. Sirkar, *Membrane Handbook*, Eds., Van Norstrand Reinhold, New York, 1992, pp. 168–201.

S. Karoor & K.K. Sirkar, *Ind. Eng. Chem.* Res. 32 1993, 674–684.

*Patent Abstracts of Japan*, vol. 12, No. 455, Nov. 29, 1988 & JP 63 182007 A (Daicel Chem Ind Ltd.), Jul. 27, 1988.

* cited by examiner

Primary Examiner—W. L. Walker
Assistant Examiner—David Sorkin
(74) Attorney, Agent, or Firm—Burns, Doane, Swecker & Mathis

(57) ABSTRACT

The invention relates to a hollow membrane (11) comprising two support layers arranged one above the other forming a space between them and a plurality of capillary tubes arranged between the support layers forming capillary channels for the flow of a first fluid, the space between the capillary tubes forming an internal cavity for the circulation of a second fluid around the capillary tubes, and the whole assembly being made of an organic polymer.

These membranes (11) can be assembled into modules for the treatment of a fluid with intermediate porous panels (13).

9 Claims, 4 Drawing Sheets

HOLLOW MEMBRANES WITH CAPILLARY TUBES

DESCRIPTION

1. Technological Field

The invention relates to hollow membranes intended for the treatment of fluids (liquids and/or gases) with a view to separating from them one or more constituents by absorption, adsorption and/or transfer phenomena through a membrane produced in a material having properties specific to one or more of the treated fluids. It is also applicable to the transfer of material and/or heat between two fluids separated by said membrane.

The invention also relates to treatment modules for fluids that include such membranes. These modules can be used in various fields, for example, to wash acidic gases for the preparation of synthesis gases and to combat environmental pollution by purifying the gases from a furnace or by treating aqueous effluents.

The invention is also applicable to biological processes such as fermentation, the manufacture of proteins, biological oxidation processes as well to medical equipment such as blood oxygenators and artificial kidneys.

2. State of the Prior Technology

The membranes used for the treatment of fluids up to now are, either flat membranes or membranes in the form of hollow fibers.

For the latter, the possibility has been studied of producing them in the form of hollow fibers of small length and diameter as described in document 1: WO-A-95/00238. Limiting the length of the hollow fibers allows one, in particular to limit the pressure drop of the fluid circulating in them as is the case in natural capillary membranes such as those in the human lung. In effect, in these natural systems, the capillaries that supply the blood have an internal diameter as low as 7 $\mu$m, but they have low flow resistance because of their extremely short length of about 100 $\mu$m. This is the reason why natural systems are so efficient for mass transfer.

Document 1 illustrates a membrane panel of self-supporting hollow fibers comprising two base layers of a textile material encapsulated in a non-permeable material, and a multiplicity of hollow fibers of permeable material that extend between the two layers already mentioned. Hence, in this membrane with hollow fibers, the support layers have no particular property whatsoever in relation to the fluid to be treated since they are made of a non-permeable material.

Document 2: U.S. Pat. No. 4,959,152 describes an assembly of hollow fibers comprising a plurality of stacked discs in which the hollow fibers are arranged horizontally so that a fluid circulates in parallel in all of the discs. These fibers are shorter than in traditional devices but they still have a large length compared with the size found in natural systems such as the human lung.

Document 3: U.S. Pat. No. 5,104,535 describes an assembly of hollow fibers mounted between two end supports and assembled one above the other to form modules which are arranged side by side within a treatment enclosure. As in the preceding document, the hollow fibers still have lengths which are large compared with that found in natural systems used for material transfer.

With the techniques described above, the following problems have to be faced. Because of the large thickness of the membranes in the form of hollow fibers, there is always a requirement to make the surface of the pores of said membranes hydrophobic by using rather complex methods which in addition are not sufficiently reliable. So as to prevent the passage of a liquid containing the component to be transferred, through the pores of said membranes it is always necessary to make a precise adjustment of the differential pressure on both sides of said membranes. Using membranes in the form of hollow fibers having a length of the order of one meter and a length to internal diameter ratio of the order of 2000, a pressure difference between the inlet and the outlet of said fibers is obtained which is too great. If one tries to reduce the thickness of the membrane in the form of hollow fibers, the reliability of the device is reduced since the probability of rupturing said membranes is increased. Furthermore, the absence of rigidity in the hollow fibers means that these fibers have a tendency to stick to one another under the action of the fluid flows thereby causing the hydrodynamic flow conditions of the fluids to deteriorate.

In natural capillary systems like a lung, an intestine or a kidney, there is a vast number of more or less short capillaries on the surface being used for material transfer. These are the alveoli in the lungs or the epithelium, the villosities and micro-villosities in the intestines and finally the glomerulic capillaries in the kidneys which comprise fine capillaries with a length to diameter ratio of between about 10 and about 30. Numbering about $5 \times 10^8$, the pulmonary alveoli represent a surface area of about 200 m$^2$. Grouped in little clusters, the alveoli are formed from cells with a very thin wall. The transfer of gases (oxygen and carbon dioxide) is carried out through the walls of these alveoli cells. The mass of blood which passes in 24 hours in the lungs is estimated to be 10 m$^3$.

Thanks to the micro-villosities found on the external surface of the wall of biological cells making up the intestinal epithelium, the geometric absorption surface area of each of these cells increases several hundred times. These intestinal villosities carry out continuous to and fro movements in the liquid pulp resulting from digestion. The passage of digested foodstuff into the blood and the lymph is encouraged thanks to the turbulence in the liquid medium. In the case of the lungs, a system of capillaries is observed the diameter of which progressively decreases along the path of the aspirated air from the trachea towards the alveoli, the number of capillaries increasing in the same direction. This is why natural capillary systems are so efficient for the transfer of material from a surrounding medium into the blood, through the walls of capillaries formed by a biological route.

Material transfer in capillaries of small diameter takes place under a laminar fluid flow regime. So as to make the transfer more intensive under specific conditions it is necessary to have short capillaries of small diameter and a small intercapillary distance, on the one hand and capillaries with a thin wall on the other hand. By using hollow fibers for this purpose, the material transfer step in a gas-liquid system is limited by the rate of diffusion in the liquid phase, and the overall rate of the transfer process is proportional to the total surface area of the membrane despite the porosity of the membrane (or the wall of the hollow fibers).

When using hollow fibers, having the properties described above, one makes a distinction between two operating regimes for the membrane: a wetted membrane and a non-wetted membrane. Obtaining one or the other regime depends on the pressure used and the interaction between membrane and liquid. The strength of a membrane, the pores of which are full of a liquid phase (wetted regime) is much greater than that of a membrane the pores of which are full of a gaseous phase.

This invention proposes a resolution of the problems described above by means of a hollow membrane, with capillary tubes, the structure of which is much closer to that of natural biological systems.

DESCRIPTION OF THE INVENTION

To this end, the invention proposes a hollow membrane comprising two support layers arranged one above the other forming a space between them and a plurality of capillary tubes arranged between the support layers forming capillary channels for the flow of a first fluid, the space between the capillary tubes forming an internal cavity for the circulation of a second fluid around the capillary tubes, and the two support layers and the capillary tubes being made of an organic polymer.

This particular structure for the hollow membrane of the invention offers a number of advantages. In effect, the capillaries formed between the two support layers can have the following characteristics:

- a very small length, for example from 1 to 1000 micrometers ($\mu$m) preferably from 3 to 200 $\mu$m and more preferably from 5 to 60 $\mu$m,
- a very small internal diameter, for example from 0.02 to 50 $\mu$m, preferably from 0.1 to 10 $\mu$m,
- a very small wall thickness, for example, from 0.01 to 10 $\mu$m, preferably from 0.1 to 3 $\mu$m, and
- a very high number of capillary tubes per unit surface area, for example from $10^4$ to $8\times10^9$ capillary tubes/cm$^2$, preferably from $10^5$ to $5\times10^8$ capillary tubes/cm$^2$.

Hence a structure is provided that has characteristics close to those of natural systems such as the lung, the kidney and the intestine.

Furthermore, the hollow membrane of the invention has not only an exchange surface at the capillary tubes but also at the two support layers which are made of the same material as the capillary tubes.

According to the invention, the hollow membrane is produced preferably in an organic polymer capable of being obtained by chemical or electrochemical oxidation of a precursor monomer.

In particular, such polymers can be heterocyclic polymers or polyacetylene. As an example of heterocyclic polymers one could mention the polypyrroles the polyanilines and the polythiophenes.

It should be made clear that by polypyrrole one understands not only the polymers obtained from pyrrole but also those obtained from pyrrole derivatives. The same applies for polyanilines and polythiophenes.

In the hollow membrane of the invention, the capillary tubes are preferably arranged substantially perpendicular to the two support layers and/or along directions that make angles of, at the most 45° with the perpendicular to the support layers.

The hollow membrane of the invention can be used to transfer a component from a first fluid fed under pressure into the capillary tubes of the hollow membrane to another fluid flowing in the internal cavity of the hollow membrane. Hence the two fluids which are participating in the transfer process of the component in question are separated in the hollow membrane by a separation layer that comprises on the one hand the walls of the capillary tubes and on the other hand the two support layers.

Another subject of this invention is a method of manufacturing a hollow membrane having the characteristics given above.

This method comprises the following steps:

a) forming on the external surfaces and in the pores of a membrane matrix, that includes open rectilinear pores arranged between its two external surfaces, a coating of organic polymer by in situ polymerization of a precursor monomer of the polymer, and b) then removing the material forming the membrane matrix by destruction in a selective reactant which does not affect the polymer in order to form the internal cavity of said hollow membrane.

In this method, one starts with a membrane matrix that includes rectilinear pores having dimensions slightly greater than those of the capillary tubes to be produced and a thickness that corresponds to the length of the capillaries to be produced.

This membrane matrix can be made of a polymeric material or an inorganic material. Preferably, the rectilinear pores have been created in this membrane matrix by irradiation with a beam of heavy ions followed by dissolution of the material in the tracks made by the ions and/or around them. A technique of this type is described in the following documents:

Flerov G. N. Synthèse des éléments superlourds et application des méthodes de physiques nucléaire dans les domaines voisins. Vestnik de l'académie des sciences de l'URSS, 1984 no. 4, p. 35–48 (in Russian).

Apel, P. Yu, Kuznetsow, V. I., Zhitariuk, N. I. & Orelovich, O. L. (1985) Nuclear ultrafilters. Colloid Journal of the USSR, 47, 1–5 (in English).

The polymeric materials capable of being used can be, for example, polycarbonates, polyethylene terephthalate, polyimides or polyvinylidene fluoride. With such polymeric materials, one can use as the selective reactant in step b) of the method, bases and inorganic acids or potassium permanganate in the case of polyvinylidene fluoride.

The inorganic materials capable of being used to form the membrane matrix can be, for example, aluminum oxide or mica. In the case of aluminum oxide, the reactant used in step b) can be an inorganic base or an inorganic acid. In the case of mica, hydrofluoric acid is preferably used as a reactant in this step b).

The membrane matrices that can be used in the invention having a thickness of from 1 to 1000 $\mu$m, preferably from 3 to 200 $\mu$m and more preferably from 5 to 60 $\mu$m, a pore diameter of from 0.02 to 50 $\mu$m, preferably from 0.1 to 10 $\mu$m and a pore density of $10^4$ to $8\times10^9$/cm$^2$, preferably from $10^5$ to $5\times10^8$ cm$^{-2}$ are sold by the following companies: Costar, Millipore, Osmonics (United States of America), Whatman (Belgium, England) and Centre de Physique Appliquée de l'Institut Uni des Recherches Nucléaires (Russia).

Mineral membranes that can be used as a membrane matrix are sold under the trade mark Anopore® by the company Whatman and they have a pore diameter of from 0.1 to 0.2 $\mu$m, a thickness of about 60 $\mu$m and a porosity of from 40 to 60%.

According to the invention, a coating of organic polymer is deposited on these membrane matrices, not only on the external surfaces of the membrane matrix, but also in the pores of the membrane, by in situ polymerization of a monomer precursor of the polymer.

This polymerization can be carried out chemically or electrochemically and is applied to monomer precursors chosen from the group comprising the following heterocyclic compounds: pyrrole, aniline, thiophene and their derivatives as well as acetylene. The polymerization of the monomer precursor can be initiated in an aqueous phase or an organic phase using polar solvents such as acetonitrile and propylene carbonate or a mixture of an organic solvent (an alcohol for example) and water, by an oxidizing agent chosen from the group comprising ferric ($Fe^{3+}$) salts, tetra-alkylammonium periodates, perbromates or perchlorates or the periodates, perbromates or perchlorates of other cations, or salts containing the persulfate anion. The polymerization is carried out preferably by bringing one face of the membrane matrix into contact with a solution of the monomer precursor and the other face of the membrane into contact with the oxidizing agent.

So as to obtain a polymer layer, that is to say a separation layer, having different pore sizes, different degrees of wetting by aqueous solutions or organic solvents, and/or different electro-conductivity properties, rigidity, porosity and flexibility, one can:

a) add to the solution that already contains the oxidizing agent, a doping agent chosen, in general, from among the Lewis acids, preferably from among the compounds that have an anion of the ($R—SO_3^-$) type where R is an alkyl, aryl or alkylaryl group, such as the alkylbenzene sulfonic acids, alkyltoluene sulfonic acids or salts of said acids;

b) carry out a co-polymerization by grafting onto said separation layer unsaturated compounds chosen from the group comprising acrylic acid, vinyl pyrrolidone, vinyl pyridine, acrylamide and their derivatives;

c) treating said separation layer in a plasma or with radiation from an excimer (excited dimer) laser with or without injection of organic molecules (benzene and its derivatives, alkenes); or d) treating said polymer with mineral alkalis such as sodium or potassium hydroxide.

The doping or de-doping process described above can lead to a change in the size of the pores in the layer of deposited polymer, that is to say in the separation layer. By doping this layer. Preferably during the polymerization, one arrives at a separation layer without any pore at all. By subsequently carrying out a de-doping of the separation layer by treatment in basic media, the ions (molecules) of doping agent are removed from said layer and they are replaced by another doping agent having a smaller size. The size of said pores depends on the size of the ions or molecules of doping agent that are removed: the bigger they are, the bigger the pores in the separation layer are.

The treatments described above can be carried out at the time of the polymerization of the monomer precursor, or as a complementary treatment after the formation of the polymer layer.

The thickness of the polymer layer deposited on the surfaces and in the pores of the membrane matrix depends on the polymerization conditions, the concentration of reactants in the polymerization solutions and the duration of the polymerization. Generally, one operates at a temperature of from $-35°$ to $+30°$ C. Generally the thickness of the polymer layer deposited is greater on the surfaces of the membrane than on the walls of the rectilinear pores, or capillary tubes. In order subsequently to carry out step b) of destroying the material forming the membrane matrix, it suffices to make an opening in the deposited polymer layer and to cause a reactant to enter that is capable of destroying the material forming the membrane matrix while leaving the layer of deposited polymer intact.

After this operation, one may, if necessary, subject the polymer layer to the doping and de-doping treatments described above.

A further subject of the invention is a module for the treatment of a fluid comprising at least one hollow membrane such as that defined above arranged within a sealed enclosure in such a way as to provide, between two adjacent hollow membranes and between each hollow membrane and an adjacent side wall of the enclosure, spaces for the circulation of a first fluid uniquely in communication with the inside of the capillary tubes of the hollow membrane or membranes, means of circulating said first fluid in the capillary tubes of the hollow membranes by introducing it into one of said circulation spaces and by collecting it in another of said circulation spaces and means of circulating at least one second fluid in the internal cavity or cavities of the hollow membrane or membranes.

Preferably in this module, the spaces for circulation of the first fluid are filled with packing that allows turbulence to be generated in the first fluid.

This packing can, in particular, be in the form of a porous material, the pores of which have dimensions that are greater than the diameter of the capillary tubes.

By way of example, circulation spaces for the first fluid can be produced in the form of porous panels, that have, for example, a pore dimension of from 0.1 to 200 $\mu$m, preferably from 5 to 150 $\mu$m and a thickness of from 10 to 1000 $\mu$m, preferably from 20 to 200 $\mu$m. The pore dimensions of this porous material are preferably such that the ratio of the pore size to the diameter of the capillary tubes is from 5 to 200, preferably from 10 to 200 and more preferably from 10 to 50.

In the module of the invention, these porous elements which are arranged on either side of the hollow membrane or membranes are intended to distribute the fluid to the capillary tubes of the hollow membrane or membranes and to generate turbulence in said fluid by forming hydraulic eddies in it thanks to a rise in the Reynolds number. This allows one to intensify the material transfer and or the heat transfer in the fluid before it enters the capillary tubes of the hollow membrane.

In order to improve the separations carried out in the hollow membrane, one may also partially fill the pores of the porous material with a compound chosen from among catalysts, enzymes and sorbents that are insoluble in said first fluid in such a way as to carry out catalytic or other reactions in the first fluid before its entry into the capillary tubes of the hollow membrane. Such a reaction can be carried out, for example in order to retain a component and/or fine particles of the first fluid before its treatment in the capillary tubes. A catalytic reaction can also be used to obtain a component subsequently separated in the capillary tubes.

Of course the lining of the pores is carried out in such a fashion that the ratio of the pore dimension of the porous material to the internal diameter of the capillary tubes remains within the range of from 10 to 50 and the size of the catalyst or sorbent particles must be greater than the internal diameter of the capillary tubes.

According to the invention, one may assemble several hollow membranes in such a way as to form a stack that allows the fluid to be treated or the first fluid, to be brought into contact through the walls of the capillaries with a second and possibly a third fluid.

According to a first embodiment of this assembly, the module comprises:

a stack of n hollow membranes and (n+1) panels of porous material alternating with the hollow membranes in such a way that each hollow membrane is positioned between two panels of porous material, these panels forming spaces for the circulation of the first fluid, means of introducing the first fluid onto the lower or upper face of the stack and of recovering it at the opposite face of this stack, a chamber for the introduction of the second fluid, arranged on a lateral face of the stack and in communication with the internal cavities of the hollow membranes, and a chamber for receiving the second fluid arranged on the opposite lateral face of the stack and in communication with the internal cavities of said hollow membranes.

According to a second embodiment of this assembly, the module comprises:

n hollow membranes and (n+1) panels of porous material alternating with the hollow membranes in such a way that each hollow membrane is positioned in a stack between two panels of porous material, these panels forming spaces for the circulation of the first fluid, the stack comprising a first series of hollow membranes with an odd number and a second series of hollow membranes with an even number arranged between the membranes with an odd number, means of introducing the first fluid onto the lower or upper face of the stack and of recovering it at the opposite face of this stack, a chamber for the introduction of the second fluid, arranged on a first lateral face of the stack and in communication with the internal cavities of the hollow membranes of the first series, a chamber for receiving the second fluid arranged on the lateral face opposite to said first face and in communication with the internal cavities of said hollow membranes of the first series, a chamber for the introduction of a third fluid, arranged on the lateral face, called the second lateral face, contiguous with said first lateral face and in communication with the internal cavities of the hollow membranes of the second series, a chamber for receiving the third fluid arranged on the lateral face opposite to said second face and in communication with the internal cavities of the hollow membranes of the second series.

According to a third embodiment of this assembly, the module comprises:

a stack of n hollow membranes and (n+1) panels of porous material alternating with the hollow membranes in such a way that each hollow membrane is positioned between two panels of porous material, these panels forming spaces for the circulation of the first fluid, the stack comprising a first series of hollow membranes with an odd number and a second series of hollow membranes with an even number arranged between the membranes with an odd number, means of introducing the first fluid onto the lower or upper face of the stack and of recovering it at the opposite face of this stack, a chamber for the introduction of a second fluid, arranged on a first lateral ace of the stack and in communication with the internal cavities of the hollow membranes of the first series, a chamber for receiving the second fluid arranged on the lateral face of the stack, called the second face and contiguous with said first face and in communication with the internal cavities of said hollow membranes of the first series, a chamber for the introduction of a third fluid, arranged on another lateral face of the stack, called the third face, and in communication with the internal cavities of the hollow membranes of the second series, a chamber for receiving the third fluid arranged on the last lateral face of the stack, called the fourth lateral face, said chamber being in communication with the internal cavities of the hollow membranes of the second series.

Preferably, in these three embodiments of the assembly, the stack is arranged between two rigid grids, whose openings are at least equal to or greater than the pore dimension of the panels of porous material. Furthermore, in these assemblies, one can use hollow membranes, at least one of which has different characteristics with regard to the diameter, the length and/or the quantity of capillary tubes, in order to obtain particular effects.

Preferably, the diameter of the capillary tubes reduces from one hollow membrane to the other in the direction of flow of the first fluid while the number of capillary tubes per unit of surface area of hollow membrane increases from one hollow membrane to the other in the direction of flow of the first fluid.

This arrangement allows one to have a module with characteristics that are closer to those of natural capillary systems.

The modules described above can be produced by a ethod comprising the following steps:

1) Preparing at least one composite membrane by forming, on the external surfaces and in the pores of a membrane matrix comprising rectilinear open pores arranged between its two external surfaces, a coating of organic polymer by in situ polymerization of a monomer precursor of the polymer, 2) Forming, from the composite membrane or membranes and panels of porous material, a stack in which each composite membrane is arranged between two panels of porous material, 3) Forming sealed joints between the composite membranes and the porous panels on the lateral faces of the stack, 4) Making openings in the sealed joint only at the level of the composite membranes, and for each composite membrane only on two different lateral faces of the stack, 5) Introducing through these openings a reactant capable of destroying the material forming the membrane matrix of the composite membranes without affecting the polymer covering the surfaces and the pores of the membrane matrix, in order to obtain a stack of hollow membranes and panels of porous material in which the internal cavities of the hollow membranes are accessible on two lateral faces of the stack.

Other characteristics and advantages of the invention will better become apparent on reading the description which follows, given, it should be understood for illustrative purposes only, being non-limitative and making reference to the appended drawings.

DETAILED DESCRIPTION OF THE EMBODIMENTS

The manufacture of a hollow membrane conforming to the invention will now be described making reference to FIGS. 1 to 3.

Figure 1:
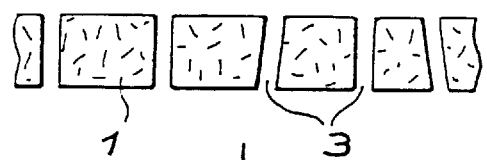
FIG. 1 is a view in vertical section of a membrane matrix used for the manufacture of the hollow membrane of the invention.

For the manufacture of this hollow membrane, one starts with the membrane matrix 1 shown in vertical section in FIG. 1 which can be produced in a polymeric material or an inorganic material. It includes rectilinear pores which are at right angles or are slightly inclined and totally pass through membrane matrix 1. These pores can be obtained by the action of a beam of heavy ions on a flat membrane, they can be oriented perpendicular to the two surfaces of the membrane or make an angle up to 45° with respect to the direction perpendicular to the surface of membrane 1.

Figure 2:
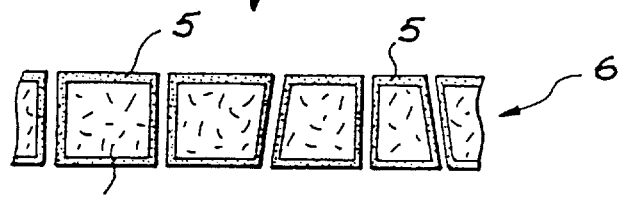
FIG. 2 illustrates in vertical section, a composite membrane obtained from the membrane matrix of FIG. 1.

In FIG. 2, the composite membrane 6 obtained after having coated the two external surfaces of membrane matrix 1 and the inside of its pores 3 with an organic polymer is shown. In this Figure, one can see the membrane matrix 1 coated with a layer of polymer 5. After having formed the composite membrane of FIG. 2, the material which formed the starting membrane matrix is dissolved in order to obtain a hollow membrane made up only of organic polymer. To this end, the inside of the membrane is made accessible by making an opening in the sides and immersing it in a suitable solvent that is capable of dissolving the material that forms the matrix without dissolving the organic polymer. In this way the hollow membrane shown in FIG. 3 is obtained. This comprises two support layers (5a and 5b) made of organic polymer and capillary tubes 3 also made of polymer arranged between these two support layers. The space between the capillary tubes forms an internal cavity 7 for circulation of a second fluid around the capillary tubes.

Figure 4:
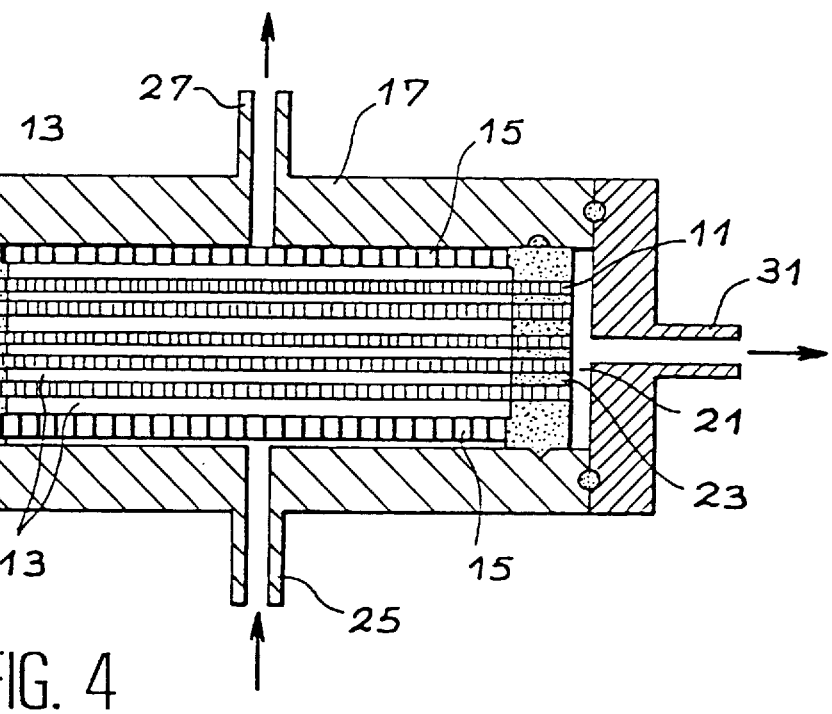
FIG. 4 represents diagrammatically and in vertical section a fluid treatment module conforming to a first embodiment of the invention.

In FIG. 4, the first embodiment of a fluid treatment module conforming to the invention is shown.

This module is formed from a stack of n hollow membranes 11 which are 5 in number in this Figure, and from (n+1) porous panels 13 that alternate with the hollow membranes 11 so that each hollow membrane 11 is arranged between two porous panels 13. The stack is supported by two grids 15 arranged on either side of the stack. The assembly is inserted into a sealed enclosure 17 by fitting onto two opposite lateral faces of the enclosure, an introduction chamber 19 for a second fluid and a receiving chamber 21 for this second fluid. These chambers are only in communication with the internal cavities of the hollow membranes 11, joints 23 being inserted at the level of each porous panel 13. The fluid to be treated is introduced at the base of the stack through pipe 27. After having circulated in the porous panels 13 and then in the capillary channels of the hollow membranes 11 where it is brought into contact through the walls of the capillaries with the second fluid introduced through pipe 29, it is recovered through pipe 31.

Of course, one could use this device by introducing the first fluid in pipe 27 and recovering it through pipe 25.

Although on this drawing several hollow membranes 11 have been shown, a fluid treatment module could be produced that only comprises a single membrane surrounded by two circulation spaces 13 for the fluid to be treated possibly filled with a porous material.

Using this embodiment of the module of the invention, one can transfer a component from the first fluid to be treated into the second fluid or the inverse. The second fluid could of course be the fluid to be treated.

One can produce the stack shown in the module in FIG. 4 by using the relevant process steps described in FIGS. 5 to 9.

Figure 5:
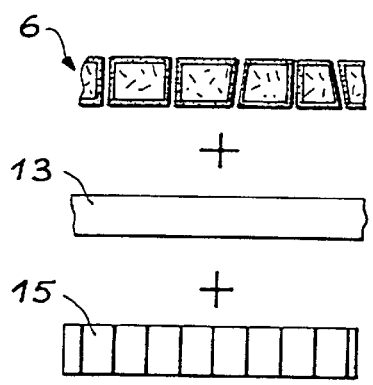
FIGS. 5 to 9 illustrate the steps in the manufacture of a fluid treatment module conforming to the invention.
Figure 6:
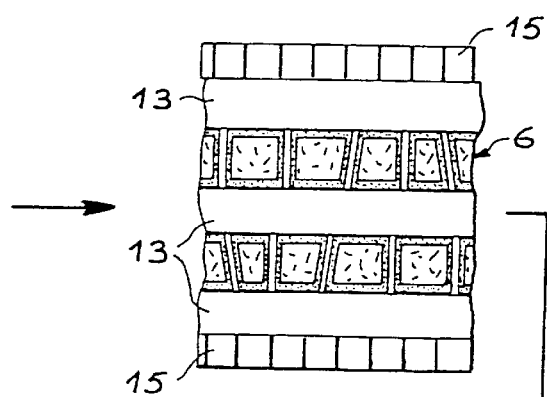
Figure 7:
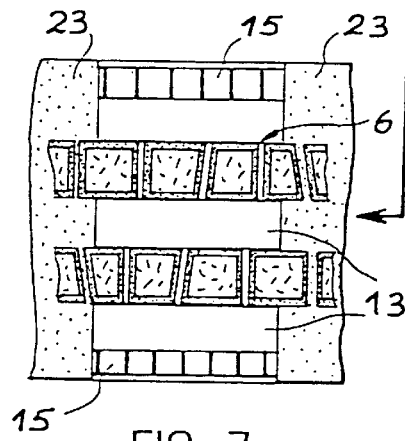

In this case, one starts with membrane matrices identical to those shown in FIG. 1 and a polymer coating is formed on them in order to obtain a composite membrane 6 conforming to FIG. 2. As shown in FIG. 5, these composite membranes 6 are then assembled with porous panels 13 and end grids 15 to form the stack in FIG. 6 where only two composite membranes have been shown. As can be seen in FIG. 7, the assembly is then sealed on the lateral walls by forming a joint 23 to make the porous panels 13 and the composite membranes 6 inaccessible. This can be done by dipping each lateral face in an adhesive or by causing partial fusion of the porous panels 13 on the periphery of the assembly. In this way the assembly shown in FIG. 7 is obtained which includes a sealed joint 23 over its entire periphery.

In order to better ensure the penetration of the adhesive into the porous panels, before assembly they can be subjected to a treatment, for example, to make them hydrophilic. This treatment can consist of:

chemical oxidation by solutions containing hydrogen peroxide, sulfuric acid with potassium dichromate or a perchlorate;

a gaseous phase oxidation by ozone, fluorine or a plasma; or grafting on hydrophilic monomers.

This treatment can only be carried out on one or certain of the elements of the stack. The adhesive must also penetrate into the capillary channels of the composite membranes over the depth of said joint.

Figure 8:
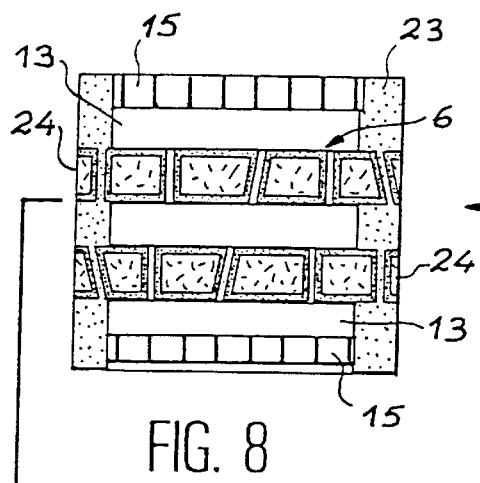

To finish this assembly, the matrix material of the composite membranes 6 is made accessible by forming openings in the joint 23 at the level of the composite membranes 6 but only on two opposite lateral faces of the assembly. In this way the half open assembly shown in FIG. 8 is obtained which includes openings 24 at each composite membrane 6 while the porous panels 13 are still fitted with the sealed joint 23. One then proceeds with the removal of the material that forms the matrix of the composite membranes 6 by introducing into the assembly a reactant capable of destroying this material without affecting the polymer. This reactant can be introduced through the openings 24 previously made and one thereby obtains the assembly shown in FIG. 9 in which the composite membranes 6 have been converted into hollow membranes 11 while the porous panels 13 remain unchanged, the internal cavities of the hollow membranes 11 being accessible through the openings 24 previously made.

Figure 9:
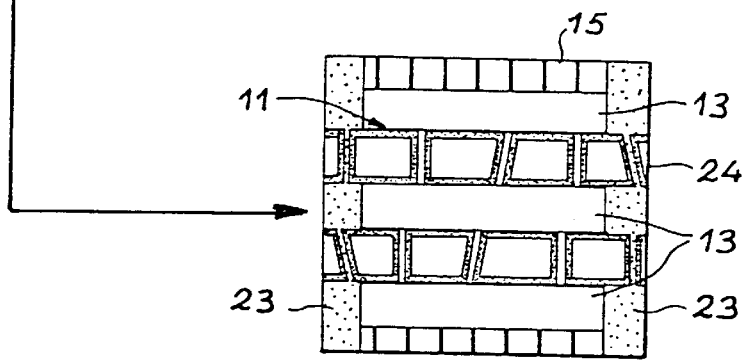

By placing the assembly of FIG. 9 in the sealed enclosure 17 shown in FIG. 4, the module shown in FIG. 4 is obtained.

Figure 10:
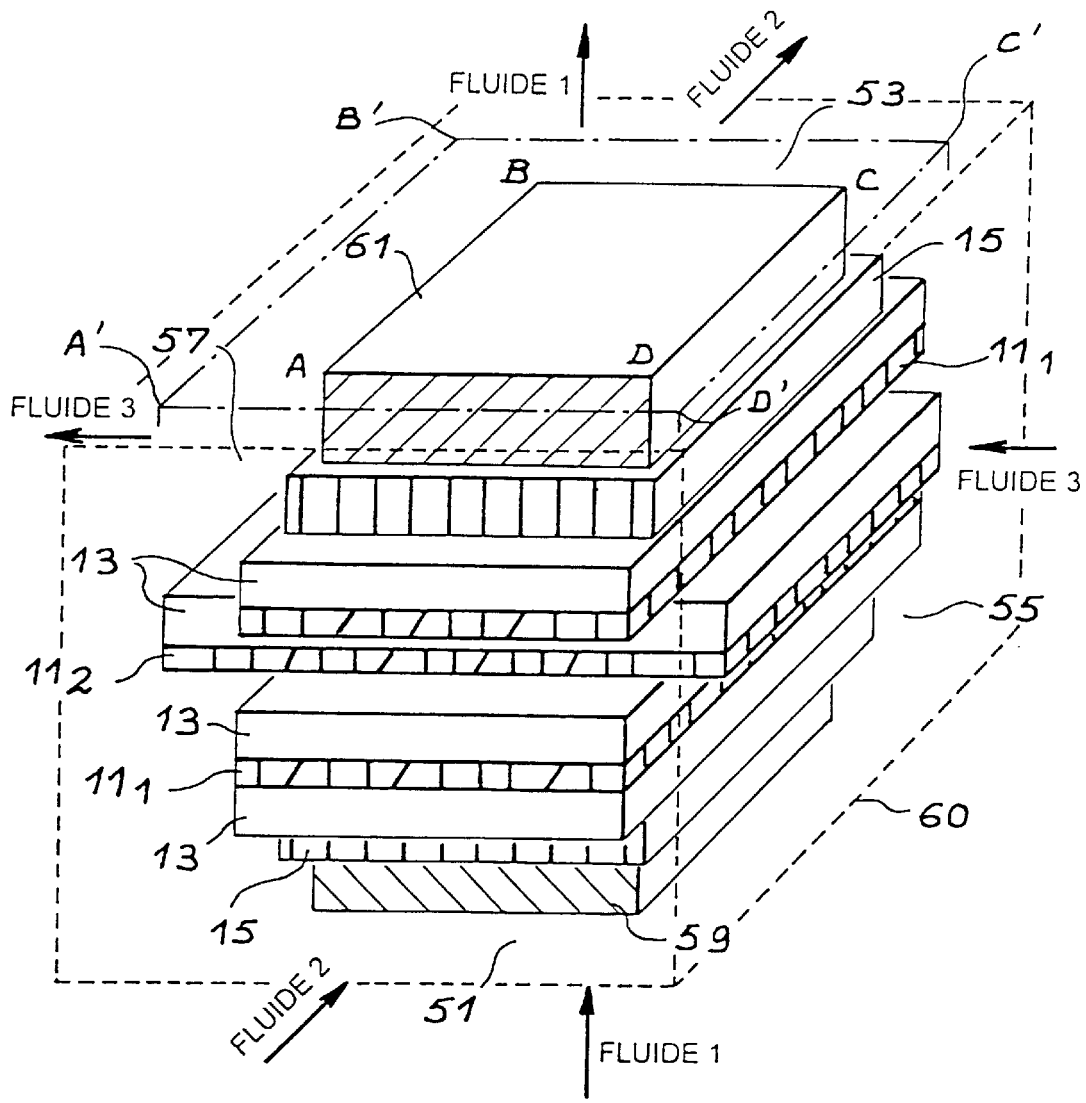
FIG. 10 illustrates in perspective a fluid treatment module conforming to a second embodiment of the invention.

In FIG. 10, a fluid treatment module conforming to the second embodiment of the invention has been shown. In this Figure, the same reference numbers have been used as in FIG. 4 to represent elements common to the two modules.

In this second embodiment, the module comprises a stack of n hollow membranes 11 (n=3 in this example) and (n+1) panels of porous material 13 (4 in this example) which alternate with the hollow membranes in such a way that each hollow membrane 11 is arranged between two porous panels 13. In this stack, the hollow membranes with an odd number or membranes of the first series are labeled $11_1$ while the hollow membrane with an even number or membrane of the second series is labeled $11_2$.

In this stack, the dimensions of the hollow membranes and of the panels of porous material and their arrangement are such that they are bounded by the enclosure:

- a front chamber 51 for the introduction of a second fluid is only in communication with the internal cavities of the hollow membranes $11_1$ with an odd number of the first series,
- a receiving chamber 53 for this second fluid on the opposite face, or the rear face, also only in communication with the internal cavities of the hollow membranes $11_1$ with an odd number of the first series,
- on the right lateral face of the stack, there is an introduction chamber 55 for a third fluid, this being only in communication with the internal cavity of the hollow membrane with an even number $11_2$ of the second series, and
- on the opposite lateral face of the module, a receiving chamber 57 for the third fluid also only in communication with the internal cavity of the hollow membrane $11_2$ of the second series.

The fluid to be treated can be introduced, as in the module in FIG. 4, at the base of the stack through pipe 59 and can be recovered at the top of it in pipe 61 after having circulated in the panels of porous material 13 and in the capillary tubes of all the hollow membranes $11_1$ and $11_2$.

In the arrangement shown in FIG. 10, the hollow membranes and the panels of porous material which are associated with them, have a rectangular section and they are arranged one above the other in such a way that the length of the section of the hollow membranes with an odd number $11_1$ are in one direction and the length of the section of the hollow membranes with an even number $11_2$ is arranged at right angles to that of the section of the hollow members with an odd number. The porous panels are arranged in the same way by associating two porous panels with the first hollow membrane situated at the base of the stack.

This assembly is arranged in a sealed enclosure designed to isolate chambers 51, 53, 55 and 57 and supply and reception pipes 59 and 61 for the different fluids from one another. On the sides of the assembly, sealed joints have also been formed so that access to the internal cavity of the even numbered hollow membrane $11_2$ is only possible in chambers 55 and 57, and access to the internal cavities of odd numbered hollow membranes $11_1$ only in chambers 51 and 53. Seals are also arranged at the base and at the top of the stack to provide circulation of the first fluid without any possibility of communication with chambers 51, 53, 55 and 57, these also being isolated from one another.

Such a module can be produced in accordance with the same method as that previously described for the module in FIG. 4 in relation to FIGS. 5 to 9. In this case, after having sealed the stack of panels and hollow membranes on these four lateral faces by immersion in the adhesive, cuts are made in such a way that openings are made uniquely into the even numbered hollow membranes or into the odd numbered hollow membranes depending on their arrangement.

In FIG. 10, the adhesive joint 60 initially made on the four lateral faces of the stack is shown with a dashed line. This adhesive joint penetrates as far as the perimeter ABCD shown on FIG. 10, which defines the area of the stack that is useful for the passage of the first fluid.

After forming this adhesive joint, the lateral faces of the stack that correspond to chambers 51 and 53, are cut away along the cut lines A'D' and B'C' shown as alternate dots and dashes, in order only to cut away the assembly formed by the membrane 11, and the porous panels that are associated with it, since these assemblies are initially protruding in relation to the cut lines. On the other hand, this cut does not reach membrane $11_2$ and the porous panel associated with it since these are recessed in relation to these cut lines. In this way the internal cavities (which will be formed after the destruction of the material constituting the membrane matrix) of the membranes $11_1$ has been made accessible to the fluid circulating from chamber 51 to chamber 53 while maintaining the seal of the internal cavity of the membrane $11_2$.

Similarly, the lateral faces of the stack that correspond to chambers 55 and 57, are cut away along the cut lines D'C' and A'B' shown as alternate dots and dashes, in order only to cut away the assembly formed by the membrane $11_2$ and the porous panel that is associated with it, without touching assemblies formed by the membranes $11_1$ and the porous panels which are associated with them, since these are recessed in relation to the cut lines. In this way the internal cavity (which will be formed after the destruction of the material constituting the membrane matrix) of membrane $11_2$ has been made accessible to the fluid circulating from chamber 55 to chamber 57.

Figure 11:
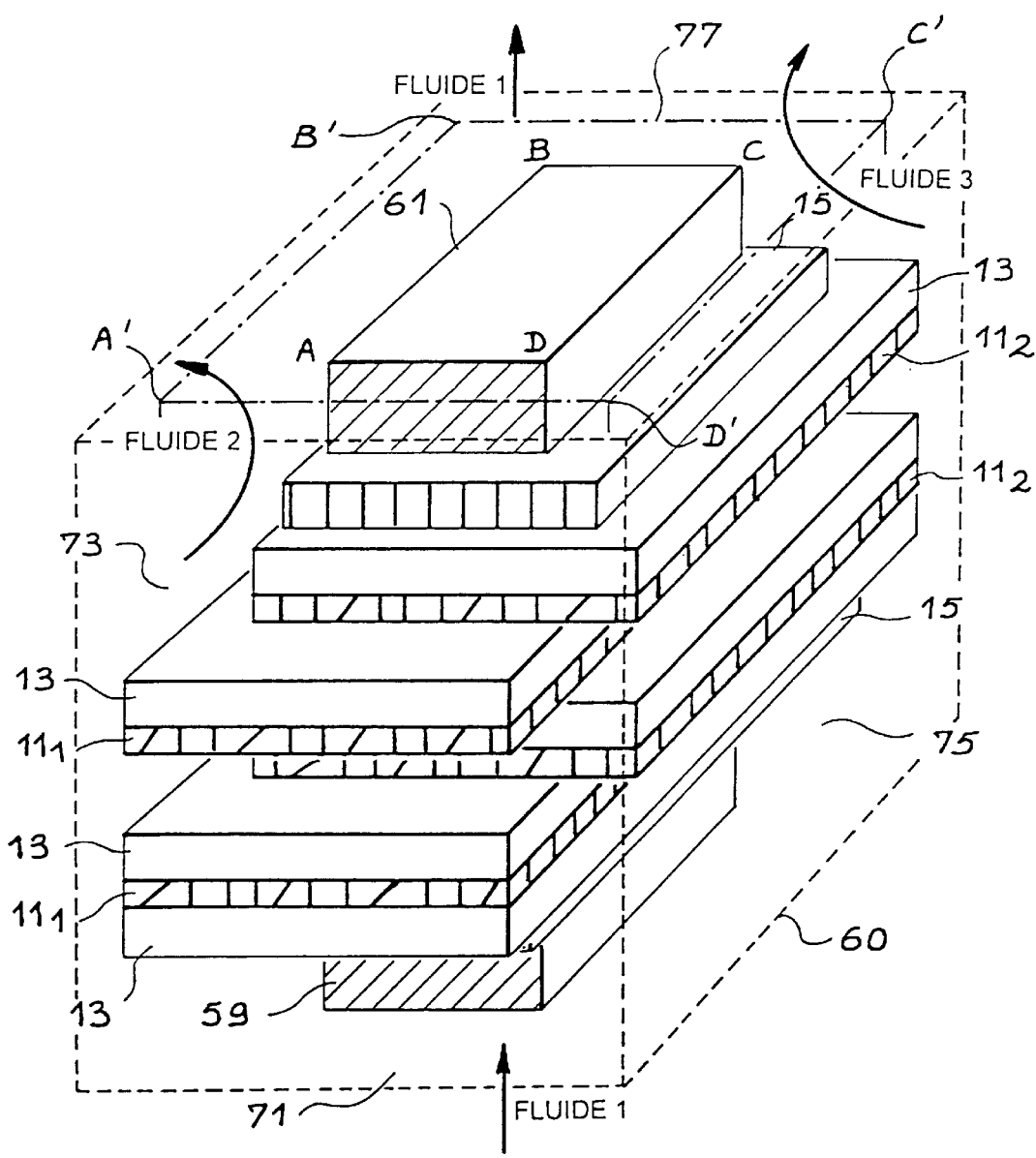
FIG. 11 is a perspective view of a fluid treatment module conforming to a third embodiment of the invention.

In FIG. 11, a fluid treatment module conforming to the third embodiment of the invention is shown in perspective.

In this Figure, again the same reference numbers have been used to designate the panels of porous material 13, the even numbered hollow membranes $11_2$, the odd numbered hollow membranes $11_1$ and the grids 15.

As may be seen in FIG. 11, the stack comprises four hollow membranes 11 which are divided into two hollow membranes of the first series $11_1$ and two hollow membranes of the second series $11_2$, and five panels of porous material 13 which are alternated with the hollow membranes as in FIG. 10.

In this stack, the dimensions of the hollow membranes and the panels of porous material and their arrangement are such that they are bounded by the enclosure.

- a front chamber 71 for the introduction of a second fluid is only in communication with the internal cavity of the odd numbered hollow membranes of the first series,
- a receiving chamber 73 for this second fluid situated on the contiguous lateral face of the stack is also in communication with the internal cavities of the first series of hollow membranes $11_1$ on their lateral faces;
- an introduction chamber 75 for a third fluid, situated on the lateral face opposite to the receiving chamber 73, is only in communication with the internal cavities of the hollow membranes of the second series $11_2$; and
- on the last face of the assembly, a receiving chamber 77 for the third fluid, is also only in communication with the internal cavities of the hollow membranes of the second series $11_2$.

The fluid to be treated can be introduced, as in the module in FIG. 10, through pipe 59 situated at the base of the stack and recovered at its outlet through pipe 61 at the top of the stack, after having circulated in the panels of porous material 13 and in the capillary tubes of all the hollow membranes $11_1$ and $11_2$.

In the arrangement shown in FIG. 11, the hollow membranes 11 and the panels of porous material 13 which are associated with them, have a rectangular or square section, and are arranged one above the other being offset both in the direction of their length and in the direction of their width in the case of a rectangle, in such a way that the even numbered hollow membranes $11_2$ protrude into the chambers 75 and 77 for introducing and receiving the third fluid, while the hollow membranes $11_1$ of the first series protrude into the chambers 71 and 73 for introducing and receiving the second fluid.

On the lateral faces of the assembly, sealed joints have been formed so that access to the internal cavities (which will be formed after the destruction of the material constituting the membrane matrix) of the hollow members $11_1$ of the first series is only possible on their front face in chamber 71, and on their contiguous lateral face in chamber 73, and that access to the internal cavities (which will be formed after the destruction of the material constituting the membrane matrix) of the hollow members $11_2$ is possible on their lateral face in chamber 75, and on their contiguous lateral face in the chamber 77 for receiving the second fluid. Sealed joints are also arranged at the base and at the top of the stack to provide circulation of the first fluid without any possibility of communication with chambers 71, 73, 75 and 77.

Such a module can be produced according to the same process as that described previously for the module in FIG. 10 by creating an adhesive joint on the four faces of the stack in such a way hat the adhesive penetrates as far as the perimeter ABCD which defines the area of the stack that is used for the passage of the first fluid.

After this operation, it is advisable to cut the lateral faces at the level of the even numbered or odd numbered assemblies (membranes and associated porous panels) to make the internal cavities of the hollow membranes of the first series $11_1$ in chambers 71 and 73 and the internal cavities of the hollow membranes of the second series $11_2$ in chambers 75 and 77 while maintaining the seal of the porous panels which are associated with them.

This can be carried out as previously by starting with the adhesive joint 60 shown with dashed lines on FIG. 11 which penetrates as far as the perimeter ABCD. After forming this adhesive joint, the lateral faces of the stack corresponding to chambers 71 and 73 are cut away along the cut lines A'D' and A'B', shown as alternate dots and dashes, in such a way as to only cut the assemblies formed by the membranes $11_1$ and the porous panels associated with them, without touching the assemblies formed by membranes $11_2$ and the porous panels associated with them, since these are recessed with respect to the cut lines. As previously, the internal cavities of the membranes $11_1$ are made accessible to chambers 71 and 73 while maintaining the seal of the internal cavities of the membranes $11_2$.

Afterwards, the lateral faces of the stack corresponding to chambers 75 and 77 are cut away following the cut lines C'D' and B'C', shown as alternate dots and dashes, which allows one to reach only the assemblies formed by membranes $11_2$ and the porous panels associated with them, without touching the assemblies formed by membranes $11_1$ and the porous panels associated with them. In this way, the internal cavities of membranes $11_2$ are made accessible to the fluid circulating in chambers 75 and 77.

Then the assembly is placed in a sealed enclosure designed in such a way that the pipes 59, 61 and chambers 71, 73, 75 and 77 are isolated from one another.

The modules shown in FIGS. 10 and 11 using the fluid to be treated and two treatment fluids can be used for example, to extract into the second fluid a component of the first fluid to be treated, and after that to add to the first fluid another component by exchange with the third fluid.

Hence, in the case of a first fluid that includes carboxyhemoglobin, the carboxy group can be extracted into the second fluid, for example by means of an amine, and then the hemoglobin can be converted to oxyhemoglobin by means of a third fluid, for example, oxygen.

The fluid treatment modules of this invention can be used as a membrane apparatus for material transfer between a gas and a liquid, between two gases or between two liquids separated by the walls of hollow membranes. They can be applied to the treatment of smokes thanks to the high thermal stability of the heterocyclic polymers, to the treatment of liquid waste downstream from pre-treatments used to hold back materials in suspension and to the separation of components of solutions and suspensions obtained in microbiological processes.

The modules of the invention can also be used as an artificial kidney or lung. By using capillaries with an internal diameter of about 10 micrometers, the device can be used as an artificial blood oxygenator. They can also be used for thermal separation processes (pervaporization, thermal membrane degasification of water and solutions to be treated) where there is simultaneous material and heat transfer.

The modules according to this invention can also be used as a membrane reactor. According to the first embodiment, the device can be used as a membrane reactor having a single separation layer which is constituted by the capillary walls. For a reaction of the type: A+B→C, this separation layer will be used for the separation of a product C from reactants A and B which react with one another in the presence or not of a catalyst. For a reaction of the type (the reaction can also be catalytic): A+B→C+D, these devices are used for the selective separation of two different products C and D from the reaction, and reactants A and B. Said catalysts can be inserted into the pores of the porous panels or can constitute a part of the porous panels. In the general case, the particles of catalyst used must be greater than the internal diameter of the capillaries of the hollow membrane.

They can also be used as an extractor for the selective transfer of ions and/or components of the first fluid to the third fluid with the second fluid acting as an intermediary. In this case, the second fluid contains a selective extracting agent for the component to be removed, for example, an amine, a crown ether, etc.

The examples which follow illustrate the production of a hollow membrane, a composite membrane and a fluid treatment module conforming to the invention.

EXAMPLE 1

Preparation of a Hollow Membrane

Figure 3:
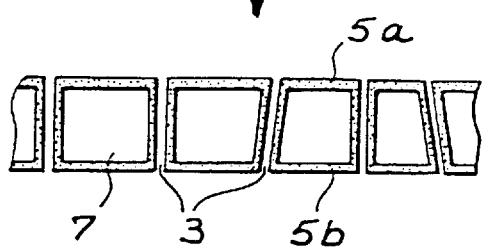
FIG. 3 illustrates in vertical section a hollow membrane obtained from the composite membrane of FIG. 2.

This membrane is prepared in conformity with the method described in relation to FIGS. 1 to 3.

One starts with a membrane matrix of polyethylene terephthalate (PETP) of 20 $\mu$m thickness comprising approximately cylindrical pores randomly inclined in relation to the perpendicular to the front surfaces of the membranes. These pores have been formed by irradiation of the membrane using beams of heavy ions and they have a size of about 0.3 $\mu$m, their inclination with respect to the perpendicular to the surfaces of the membrane ranging from 0 to 45°.

Next, a coating of polypyrrole is formed on this membrane and in its pores in order to obtain the composite membrane shown in FIG. 2. This polypyrrole coating is deposited by a chemical route, by using a solution of ferric chloride $FeCl_3$ as an oxidizing agent. To carry out this coating, the membrane is used as a diaphragm separating:

1) an aqueous solution of recently distilled pyrrole, the pyrrole concentration of which is 0.1 mol/l and which in addition contains 0.36 mol/l toluene-4-sulfonic acid as a doping agent, and
2) an aqueous solution of 0.3 mol/l ferric chloride.

Operating at ambient temperature, the polymerization is carried out over a period of 20 minutes.

The weight of the membrane is measured before and after polymerization and the increase in weight is calculated as a percentage. The increase for the sample obtained is 24.9%. The sample thus obtained is polished with sandpaper (number 600 or finer) in order to remove agglomerates of polypyrrole to be found on the surface layers of polypyrrole covering the front surfaces of the membrane. Often it is only necessary to polish the surface that was in contact with the $FeCl_3$ solution. The increase in weight of the sample after polishing is equal to 23.1%.

The sample thus obtained is treated with a solution of sodium hydroxide with a concentration of 3 mole/l at a temperature, preferably less than 35° C., for about 48 hours, in order to dissolve the PETP of the membrane matrix. Then one gradually changes the NaOH solution with distilled water by adding the latter in equal quantity to the NaOH solution. To this end, half of the solution is removed and the same quantity of water is added, progressively reducing the concentration of NaOH. This is carried out 4 times within a half hour and the fifth time all the solution is removed and distilled water is added, the sample obtained being kept in this water for 2 hours. After this final washing operation, the sample can be dried. The weight loss of the sample thus obtained with respect to the sample containing the polypyrrole and PETP is equal to 82%, which means that all of the PETP has been removed from the intercapillary space.

In this way, a hollow membrane made of polypyrrole is obtained such as that shown in FIG. 3, which includes several capillary channels 3 having an internal diameter of 0.15 µm and an external diameter of 0.3 µm, giving a wall thickness of 0.08 µm, and two support layers 5a and 5b made of polypyrrole having a thickness of about 0.2 µm.

This hollow membrane thus comprises capillary channels 3 for circulation of a first fluid and an internal cavity 7 for the circulation of a second fluid in the space between the capillaries. Contact between the two fluids is possible not only on the inside of the capillary channels but also on the support layers 5a and 5b.

EXAMPLE 2
Preparation of a Composite Membrane

In this example, the same operating method is followed as in Example 1 to prepare a composite membrane, but one starts with a polycarbonate membrane matrix with a 10 µm thickness having approximately cylindrical pores of 1.0 µm diameter. The composite membrane is formed by depositing on this membrane matrix, a layer of polypyrrole by polymerization by a chemical route as in Example 1, using a polymerization period of 30 minutes. An increase in weight of 17% is obtained.

In this way, the composite membrane shown in FIG. 2 is obtained which comprises capillary channels of internal diameter 0.5 µm, having a wall thickness of about 0.3 µm, and a support layer of polypyrrole on the top and bottom faces of the composite membrane about 0.5 µm thick.

EXAMPLE 3
Production of a Fluid Treatment Module

In this example, a module conforming to the first embodiment of the invention is produced, such as that shown in FIG. 4, using the method described in relation to FIGS. 5 to 9.

To this end, composite membranes such as those prepared in Examples 1 and 2, are stacked up, placing between them panels of porous material made of AN type polypropylene (Company Millipore) having a mean pore dimension of about 10 µm and a thickness of about 200 µm.

In this stack, the composite membranes obtained in Examples 1 and 2 are used and they are arranged in the following order from the bottom: AN porous panel/composite membrane obtained in Example 1 with capillary channels of internal diameter 0.15 µm/AN porous panel/composite membrane obtained in Example 2 with capillary channels of internal diameter 0.5 µm/AN porous panel. The assembly is arranged between two grids made of polypropylene having a mesh size of 0.2 mm.

One then proceeds with sealing the stack on its lateral faces by dipping each one of them into an adhesive of the Araldite type in such a way as to immerse each face over a thickness of 4 mm. After the adhesive is hardened, a layer of 2 mm thickness is cut away over two opposite lateral faces of the stack and then one proceeds to remove the material forming the matrix by immersion of the assembly in a 3 mol/l solution of sodium hydroxide for a period of 50 hours at ambient temperature. It is then washed as in Example 1 by gradually replacing the sodium hydroxide solution with water.

In this way, one obtains a module conforming to that shown in FIG. 4, in which one can introduce and circulate a first fluid in the capillary channels of the hollow membranes by introducing it at the base of the module and extracting it from the top, and a second fluid into the internal cavities of the hollow membranes in order to bring it into contact on the inside of the hollow membranes with the first fluid.

The presence of the panels of porous material allows the first fluid to be subjected to some turbulence which improves the rate of transfer of the components present in the fluid towards a boundary layer formed by the capillary walls and the support layers of the hollow membranes.

In Table 1 appended, the properties of the hollow membranes obtained according to the invention are reported together with those of hollow fiber membranes of the prior art and those of natural systems formed by the human lung, kidney and intestine.

On looking at this Table, one notes that the hollow membranes of the invention are closer to natural systems than are those of the prior art.

TABLE 1

| characteristics of the membrane | Data from documents 4 and 5 | Data from document 1: WO95/00258 | Capillary module | Human lung | | Kidney (glomerulic capillary) | Villosities in the intestines |
|---|---|---|---|---|---|---|---|
| | | | | alveole side | arterial side | | |
| Internal diameter of capillaries (µm) | 100–300 | 7–20 | 0.1–10 | 5–20 | 10–60 | 0.1–0.4 | 0.1 |
| Wall thickness of capillaries (µm) | 20–30 | 3–10 | 0.1–3 | 0.5–1.5 | | 0.5 | 0.03 |
| Length of capillary (µm) | $(15-80) \times 10^4$ | $(1-5) \times 10^3$ | 5–60 | $(1-5) \times 10^3$ | n.a. | n.a. | 5–10 |
| Ratio of the length to internal diameter | $(1-3) \times 10^3$ | 150–250 | 6–50 | 20–25 | n.a. | n.a. | 5–10 |

TABLE 1-continued

| characteristics of the membrane | Data from documents 4 and 5 | Data from document 1: WO95/00258 | Capillary module | Human lung alveole side | Human lung arterial side | Kidney (glomerulic capillary) | Villosities in the intestines |
|---|---|---|---|---|---|---|---|
| of the capillary Number of capillaries per unit cross section area (cm$^{-2}$) | $10^7$– × $10^3$ | n.a. | $10^5$ to 5 × $10^8$ | n.a. | n.a. | ~ $10^8$ | ~ $10^8$ |
| Porosity | 0.1–0.5 | n.a. | 0.1–0.6 | n.a. | n.a. | 0.05–0.1 | ≦0.1 |
| Specific transfer surface (m$^2$/liter) | 1–5 | 10–50 | $10^{2-10^4}$ | n.a. | n.a. | n.a. | 100–200 |
| Pressure drop in the apparatus (mm Hg) | 0–600 | 0–20 | 0–100 | 10 | 40 | 20–35 | n.a. |
| Speed of liquid in the capillaries (cm/s) | 1–10 | 0.05–1.0 | 0.1–2 | n.a. | n.a. | n.a. | n.a. |
| Existence of any change (continuous or non-continuous) in capillary internal diameter | No | Yes (limited range) | Yes | Yes | Yes | Yes | Yes |

4: Membrane Handbook, Eds. W.S. Winston Ho and K.K. Sirkar, Van Nostrand Reinhold, New York 1992
5: S. Karoor & K.K. Sirkar, Ind. Eng. Chem. Res; 32 (1993), 674–684

List of References Quoted

1: WO-A-95/00238
2: U.S. Pat. No. 4,959,152
3: U.S. Pat. No. 5,104,535
4: Membrane Handbook, Eds. W. S. Winston Ho and K. K. Sirkar, Van Nostrand Reinhold, New York 1992
5: S. Karoor & K. K. Sirkar, Ind. Eng. Chem. Res; 32 (1993), 674–684.

What is claimed is:

1. A hollow membrane having a specific transfer surface area of 100 to 10,000 m$^2$ for 1 dm$^3$ of volume comprising two support layers (5a, 5b) arranged one above the other creating between them a space and a plurality of capillary tubes (3) wherein said membrane has from $10^5$ to 5×$10^8$ capillary tubes per cm$^2$ of support layer, said capillary tubes arranged between the two support layers and each having an opening at the level of each of the support layers in such a way as to form capillary channels for the flow of a first fluid, the space between the capillary tubes and the two support layers forming an internal cavity (7) for circulation of a second fluid around the capillary tubes, the two support layers and the capillary tubes being constituted by a permeable organic polymer.

2. A hollow membrane according to claim 1, in which the organic polymer is a heterocyclic polymer, a polyaniline, or a polyacetylene.

3. A hollow membrane according to claim 2, in which the heterocyclic polymer is a polypyrrole or a polythiophene.

4. A hollow membrane according to claim 3, in which the capillary tubes have a length of from 1 to 1000 μm, an internal diameter of from 0.02 to 50 μm, and a wall thickness of from 0.01 to 10 μm.

5. A hollow membrane according to claim 3, in which the capillary tubes have a length of from 5 to 60 μm, an internal diameter of from 0.1 to 10 μm and a wall thickness of from 0.1 to 3 μm.

6. A hollow membrane according to claim 1, in which the capillary tubes have a length of from 1 to 1000 μm, an internal diameter of from 0.02 to 50 μm, and a wall thickness of from 0.01 to 10 μm.

7. A hollow membrane according to claim 1, in which the capillary tubes (3) are arranged substantially perpendicular to the two support layers (5a, 5b).

8. A hollow membrane according to claim 1, in which the capillary tubes (3) are arranged along directions that form an angle at the most 45° with the perpendicular to the two support layers (5a, 5b).

9. A hollow membrane according to claim 1, in which the capillary tubes have a length of from 5 to 60 μm, an internal diameter of from 0.1 to 10 μm, and a wall thickness of from 0.1 to 3 μm.

* * * * *